UNITED STATES PATENT OFFICE.

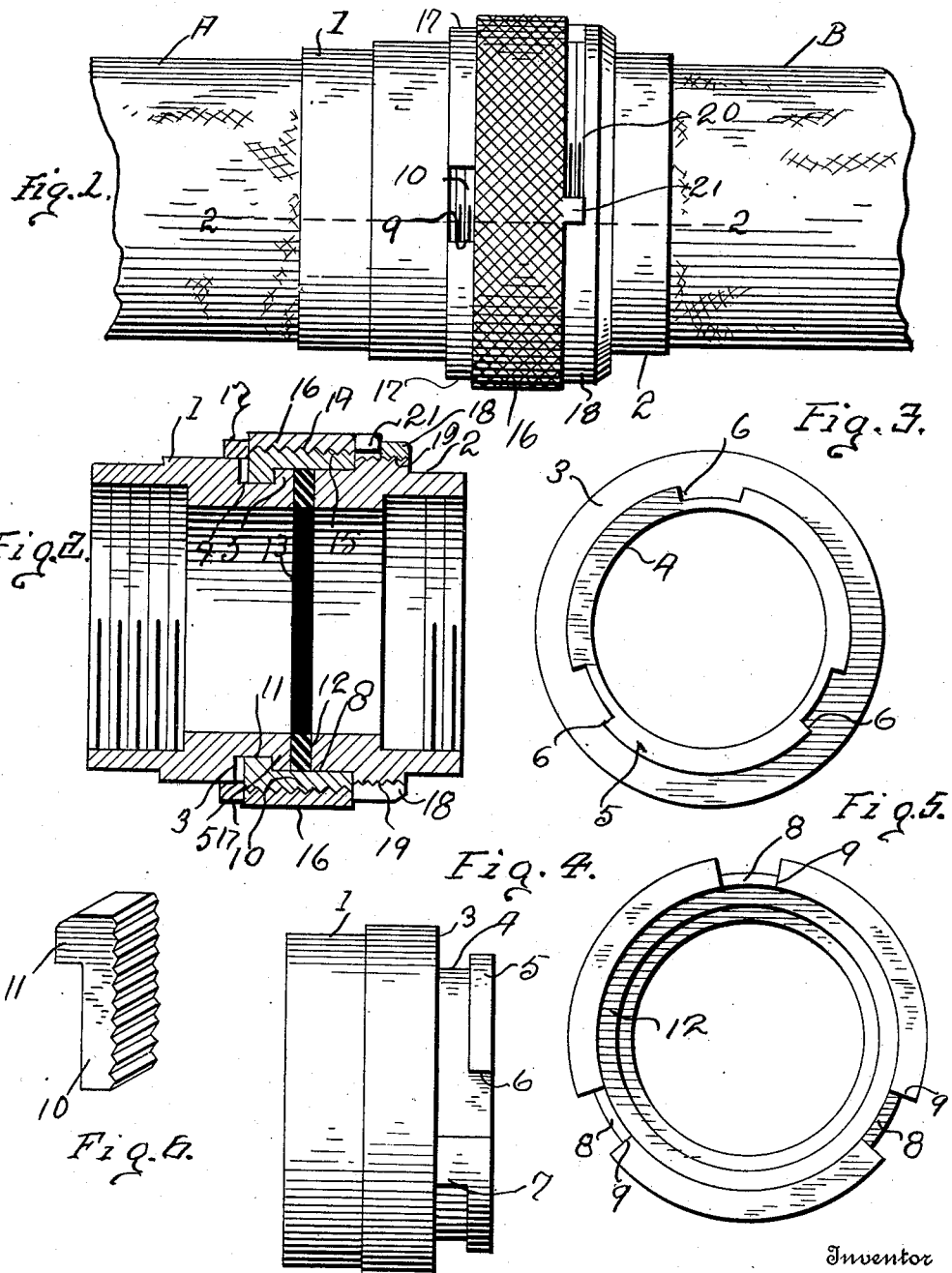

OTTO HESSE, OF HOBOKEN, NEW JERSEY.

HOSE-COUPLING.

1,077,710.  Specification of Letters Patent.  Patented Nov. 4, 1913.

Application filed September 19, 1912. Serial No. 721,207.

*To all whom it may concern:*

Be it known that I, OTTO HESSE, a citizen of the United States, residing at Hoboken, in the county of Hudson and State of New Jersey, have invented certain new and useful Improvements in Hose-Couplings, of which the following is a specification.

My invention relates to devices for coupling the two ends of lengths of hose, and has for its object the provision of a coupling device that will effect a coupling instantaneously and that is also capable of being uncoupled without material loss of time.

To this end my invention comprises a threaded ring rotatably mounted on the exterior of the female member and engaging a flap on the outer edge of said member, the threaded interior of said ring engaging threaded outer surfaces of clamping members mounted on said female member that are adapted to engage flanges on the male member to hold it in a locked position.

My invention will be described in detail hereinafter and illustrated in the accompanying drawings, in which—

Figure 1 is a side view in elevation of the meeting ends of two lengths of hose showing my improved coupling in position thereon; Fig. 2, a longitudinal sectional view of the coupling on the plane indicated by the line 2—2 of Fig. 1 which extends at an oblique angle through the coupling; Fig. 3, an end view of the male member; Fig. 4, a side view in elevation of the male member; Fig. 5, an end view of the female member; and Fig. 6, a detail perspective of one of the clamping members.

In the drawings similar reference characters will be used to designate corresponding parts throughout the several views.

A and B indicate the meeting ends of lengths of hose, the length A being shown secured to the male member 1, while the hose B is secured to the female member 2.

The male member 1 comprises a ring having an annular shoulder 3 with a forwardly extending cylindrical member 4 having a laterally extending flange 5 on its outer margin interrupted by a plurality of notches 6.

7 indicates a lug or projection formed integral with the flange 5 and extending to the shoulder 3 that operates as a stop to limit the rotation of the female member on said male member as will hereinafter be described.

The female member 2 has its exterior surface provided with a plurality of recesses 8 and its margin farthest removed from the hose B formed with notches 9 in which are slidably mounted angular clamping members 10 having their heads provided with inwardly extending portions 11 that are adapted to engage the flange 5 on the male member when in a coupling position as shown in Fig. 2. The interior of the female member 2 is formed with an inwardly extending shoulder 12 on which is adapted to be seated a gasket 13 to receive the inner margin of the male member 1.

The outer surfaces of the angular clamping members 10 are formed with threads 14 that are engaged by the interior threads 15 of a clamping ring 16, said clamping ring 16 having one of its edges engaging a shoulder 17 on the outer margin of the female member 2, while its other edge is engaged by a ring 18 screwed on to the outer surface of said female member 2 as shown at 19. The ring 18 is formed with a longitudinal recess 20 extending for substantially 90° around said ring, while the clamping ring 16 is formed with a lug or projection 21 that engages said recess 20 to limit the movement of said clamping ring when coupling and uncoupling the hose.

In operating my improved hose coupling a quarter turn of the clamping ring 16 is sufficient to completely clamp the hose and the member 1 is inserted in the member 2 when the clamping members 10 are in their outermost position, the movement of the male member within the female member being permitted when the notches 16 in the flange 5 on the male member coincide with the heads 11 of the clamping members 10. When the inner margin of the male member 1 engages the gasket 13, the male and female members are rotated on one another until the stop 7 engages one of the clamping members 10 and the clamping ring 16 is then given a quarter turn and the clamping members 10 are thereby moved inwardly of the female member 2 to frictionally engage the shoulder 5 and prevent the members 1 and 2 from rotating on one another. To uncouple the hose the clamping ring 16 is moved in the opposite direction from the movement to couple the hose so as to release the clamping members 10 from engagement with the shoulder 5 and the members 1 and 2 may be rotated to bring the heads 11 of the clamping members 10 into alinement with the notches 6 of the flange 5 and the male and female members 1 and 2 may then be removed one from the other.

Having thus described the invention what I claim is:—

A hose coupling comprising male and female members, the male member having a flange on its outer margin adapted to seat within the female member and provided with notches, the female member formed with recesses in its outer surface, clamping members slidably mounted in said recesses and having inwardly extending heads adapted to coincide with the notches in the male member and to engage the flange thereon when in the clamping position, the outer surfaces of said clamping members being threaded, a shoulder on the outer margin of the female member, a clamping ring mounted on said female member and engaging said shoulder, said clamping ring being interiorly threaded to engage the threads on said clamping members, a threaded ring mounted on said female member and having a recess therein, and the clamping ring aforesaid formed with a lug or projection operating in the recess aforesaid to limit the rotation of the clamping ring on the female member.

In testimony whereof I affix my signature in presence of two witnesses.

OTTO HESSE.

Witnesses:
RICHARD WHITE,
IDA HESSE.

Copies of this patent may be obtained for five cents each, by addressing the "Commissioner of Patents, Washington, D. C."